United States Patent Office 3,073,860
Patented Jan. 15, 1963

3,073,860
PROCESS FOR PREPARING ESTERS
FROM OLEFINS
William I. Gilbert, Oakmont, Robert E. Kline, Verona, and Charles W. Montgomery, Oakmont, Pa., assignors to Gulf Research & Development Company, Pittsburgh, Pa., a corporation of Delaware
No Drawing. Filed Mar. 16, 1961, Ser. No. 96,077
8 Claims. (Cl. 260—497)

The application relates to a process for reacting an aliphatic saturated monocarboxylic acid with an olefin to obtain an ester.

The aliphatic saturated monocarboxylic acid which is employed in the process of this invention can be either acetic acid or propionic acid or mixtures of the two. To react with the acetic acid or the propionic acid we can employ an olefin having from two to seven carbon atoms, preferably three to four carbon atoms. Examples of olefins which can thus be employed are ethylene, propylene, 1-butene, isobutylene, 1-pentene, 2-methyl-1-butene, 2-methyl-2-butene, 1-hexene, 2-methyl-2-pentene, 2,3-dimethyl-1-butene, 2,3-dimethyl-2-butene, 1-heptene, 4,4-dimethyl-1-pentene, 2,3-dimethyl-2-pentene, etc. In the reaction the reactants described above are present as vapors. Desirably the reactants are employed in approximately equal molar stoichiometric amounts, although the molar ratio of organic acid to olefin can be about 5:1 to about 1:1.

The catalyst employed must be one comprising an inert base which has been impregnated with liquid phosphoric acid at a temperature of about 180° to about 220° C. for a brief period while the ingredients are thoroughly mixed and until the resulting mixture solidifies. The catalyst batch must then be dried at temperatures of about 250° to about 270° C. for about 16 to about 24 hours, after which the solid cake is crushed and screened to desired size. The phosphoric acid content of the cake is about 15 to about 80, preferably about 30 to about 60 percent by weight thereof. While desirably the above base is kieselguhr, other inert bases such as the various fuller's earths and clays, such as bentonite, montmorillonite, etc.; certain artifically-prepared aluminum silicates, such as tonsil; etc. can also be employed.

In order to obtain a satisfactory yield of ester in accordance with the procedure of this invention it is imperative that the temperature be maintained at a low level, from about 100° to about 140° C., but preferably within a range of about 120° to about 130° C. Pressures are not critical but since the reaction is conducted in the vapor phase the pressure is desirably low, from about one-half to about five atmospheres gauge, preferably atmospheric pressure.

Not only is it imperative in the present process that the temperature be maintained within the selected limits defined above, but it is also imperative that the space velocity of the reactants through the reaction zone be maintained within well-defined ranges. In order to obtain satisfactory reaction between the reactants employed herein the space velocity of the same, expressed in terms of total liquid volumes of reactants per volume of catalyst per hour, must be from about 0.05 to about 0.30, preferably from about 0.10 to about 0.15, most preferably about 0.125. A contact time of about 45 to about 70 seconds, preferably about 55 to about 60 seconds, is satisfactory.

The reactants employed herein are passed in vapor form over the catalyst under the reaction conditions defined. Recovery of desired ester from the reaction mixture can be effected in any convenient manner. Thus the reaction mixture can be cooled from reaction temperature to atmospheric temperature by passing the same through a water-cooled condenser. The material in vapor form at this point, that is, unreacted olefin, can be recovered, if desired, for eventual recycle. The liquid product remaining can then be subjected to distillation conditions. This serves to separate the desired ester from low-boiling olefin polymers which may have been formed during the reaction. Such distillation will cause the desired ester to leave the reaction mixture for recovery. The remainder of the liquid reaction mixture will contain unreacted carboxylic acid and high boiling polymers or other materials which may have been formed during the reaction. This remainder can be treated in any suitable manner to obtain polymer and unreacted carboxylic acid.

In order to illustrate the advantages flowing from the procedure of this invention several runs were made. The data obtained are summarized below in Table I. In each of the runs a glass reactor tube closed at the top and having about a one-inch diameter and a length of about two feet was employed. In the lower portion of the reactor there was placed 100 cc. of catalyst. Catalysts employed were prepared as follows. Pyrophosphoric acid containing between 78 and 79 percent by weight of phosphorous pentoxide was mixed with a kieselguhr containing 85 percent by weight of silica and eight to nine percent by weight of moisture. The proportions by weight of each were 72 percent of the acid and 28 percent by weight of kieselguhr. The mixing was effected at a temperature of about 180° to 200° C. at atmospheric pressure. After thorough mixing the batches solidified in about two minutes. The batches were then dried at temperatures from 250° to 270° C. for 16 to 24 hours, after which the solid cake obtained was crushed and screened to a particle size of about four to about six mesh. The final analysis of the catalyst showed 63.9 percent by weight of $P_2O_5$ and 26.8 percent by weight of $SiO_2$, the remainder being principally water. The upper portion of the reactor immediately above the catalyst was packed with 150 cc. of Pyrex glass chips. The entire reactor tube was maintained at atmospheric pressure and at the desired temperature by surrounding the same with a tubular furnace. In Runs Nos. I, II, III, IV and V an average of 53 grams of liquid acetic acid and 36 grams of gaseous propylene were separately and continuously introduced into the upper or preheating section of the reactor containing the Pyrex glass chips over periods from four to 10 hours. In Run No. VI 228 grams of acetic acid and 76 grams of propylene were employed over a two-hour period, while in Run No. VII 211 grams of acetic acid and 68 grams of propylene were employed for a period of four hours.

In the preheating section a homogeneous mixture of reactants was obtained and the same was forced down through the catalysts by the incoming reactants. As the reaction mixture was withdrawn from the catalyst zone it was passed through a water-cooled condenser maintained at about 20° C. The gaseous product, mainly unreacted propylene, was thus removed from the liquid reaction product at this temperature. The liquid reaction product was then subjected to distillation at temperatures up to about 116° C. The initial overhead product consisted of isopropyl acetate; a subsequent determination was made of its ester content. The remainder of the overhead product consisted of some propylene dimer and some acetic acid. The bottoms represented mainly unreacted acetic acid and higher propylene polymers.

In Table I the space velocity is determined as defined hereinabove, even though the reactants were passed through the catalyst bed in vapor form. The percent yield of ester is the actual weight of ester obtained relative to the theoretical weight of ester, based on the propylene charged.

Table I

| Run No. | Temperature, °C | Space Velocity | Percent Yield |
| --- | --- | --- | --- |
| I | 130 | 0.124 | 17.6 |
| II | 130 | 0.124 | 17.4 |
| III | 140 | 0.145 | 15.2 |
| IV | 150 | 0.150 | 12.2 |
| V | 150 | 0.130 | 11.6 |
| VI | 115 | 1.0 | 0.5 |
| VII | 140 | 0.5 | 0.5 |

In each of Runs Nos. VI and VII only 0.5 percent by weight of the theoretical isopropyl acetate was obtained as ester product, and for such reason no analysis of the product was made. It will be seen from the above data that there is a significant reduction in amount of ester obtained as the temperature of the reaction is increased, particularly as the temperature is increased above 140° C., even though in each of Runs I, II, III, IV and V the space velocity was maintained at the desired low level. That is is important that the space velocity must also be maintained within the limits defined herein attention is invited to Runs Nos. VI and VII. In Run No. VI, even though the temperature was maintained desirably low, the space velocity was maintained at one. Only 0.5 percent of ester was obtained. The temperature was increased in Run No. VII and the space velocity was materially reduced. No appreciable change in the course of the reaction was detected.

While some fundamental properties may be of practical importance in the reaction herein described and claimed, for example, diluents, catalyst life, amount of olefin employed, etc., the most important consideration resides in the selection of the most proper combination of the most important variables, temperature and space velocity, which will yield near equilibrium amounts of desired ester without concomitant degradation of reactants or reaction products to less desirable materials. For example, the equilibrium amount of isopropyl acetate expected from a reaction of acetic acid and propylene is 20 percent at 130° C. and only 7.5 percent at 160° C. It can be seen from the data in Table I that near equilibrium yields of ester have been obtained using a proper combination of space velocity and temperature, the advantage of a lower temperature being clearly evident.

The esters produced herein can be employed as tetraethyl lead appreciator additives, solvents for cellulose acetate, cellulose nitrate, animal and vegetable oils, gums and synthetic resins, and in the formulation of pyroxylin plastics and lacquers, leather dopes, plastics and perfumes.

Obviously many modifications and variations of the invention, as hereinabove set fourth, can be made without departing from the spirit and scope thereof, and only such limitations should be imposed as are indicated in the appended claims.

We claim:

1. A process for preparing esters which comprises reacting in vapor form an organic acid selected from the group consisting of acetic acid and propionic acid with an olefin having from two to seven carbon atoms in the presence of an inert base carrying about 15 to about 80 percent by weight thereof of phosphoric acid at a temperature of about 100° to about 140° C., a pressure of about one-half to about five atmospheres and a space velocity of about 0.05 to about 0.30, said space velocity being based on the total liquid volumes of reactants per volume of phosphoric acid per hour.

2. A process for preparing esters which comprises reacting in vapor form an organic acid selected from the group consisting of acetic acid and propionic acid with an olefin having from two to seven carbon atoms in the presence of an inert base carrying about 15 to about 80 percent by weight thereof of phosphoric acid at a temperature of about 120° to about 130° C., a pressure of about one-half to about five atmospheres and a space velocity of about 0.10 to about 0.15, said space velocity being based on the total liquid volumes of reactants per volume of phosphoric acid per hour.

3. A process for preparing esters which comprises reacting in vapor form acetic acid with an olefin having from two to seven carbon atoms in the presence of an inert base carrying about 15 to about 80 percent by weight thereof of phosphoric acid at a temperature of about 100° to about 140° C., a pressure of about one-half to about five atmospheres and a space velocity of about 0.05 to about 0.30, said space velocity being based on the total liquid volumes of reactants per volume of phosphoric acid per hour.

4. A process for preparing esters which comprises reacting in vapor form propionic acid with an olefin having from two to seven carbon atoms in the presence of an inert base carrying about 15 to about 80 percent by weight thereof of phosphoric acid at a temperature of about 120° to about 130° C., a pressure of about one-half to about five atmospheres and a space velocity of about 0.10 to about 0.15, said space velocity being based on the total liquid volumes of reactants per volume of phosphoric acid per hour.

5. A process for preparing esters which comprises reacting in vapor form acetic acid with propylene in the presence of an inert base carrying about 15 to about 80 percent by weight thereof of phosphoric acid at a temperature of about 100° to about 140° C., a pressure of about one-half to about five atmospheres and a space velocity of about 0.05 to about 0.30, said space velocity being based on the total liquid volumes of reactants per volume of phosphoric acid per hour.

6. A process for preparing esters which comprises reacting in vapor form propionic acid with propylene in the presence of an inert base carrying about 15 to about 80 percent by weight thereof of phosphoric acid at a temperature of about 120° to about 130° C., a pressure of about one-half to about five atmospheres and a space velocity of about 0.10 to about 0.15, said space velocity being based on the total liquid volumes of reactants per volume of phosphoric acid per hour.

7. A process for preparing esters which comprises reacting in vapor form acetic acid with propylene in the presence of an inert base carrying about 15 to about 80 percent by weight thereof of phosphoric acid at a temperature of about 130° C., a pressure of about atmospheric and a space velocity of about 0.125, said space velocity being based on the total liquid volumes of reactants per volume of phosphoric acid per hour.

8. A process for preparing esters which comprises reacting in vapor form propionic acid with propylene in the presence of an inert base carrying about 15 to about 80 percent by weight thereof of phosphoric acid at a temperature of about 130° C., a pressure of about one-half atmosphere and a space velocity of about 0.125, said space velocity being based on the total liquid volumes of reactants per volume of phosphoric acid per hour.

References Cited in the file of this patent

UNITED STATES PATENTS

| 2,174,985 | Lazier | Oct. 3, 1939 |
| 2,678,332 | Cottle | May 11, 1954 |